US008856893B2

(12) United States Patent
Min

(10) Patent No.: US 8,856,893 B2
(45) Date of Patent: Oct. 7, 2014

(54) SYSTEM AND METHOD FOR AN ATM ELECTRONIC LOCK SYSTEM

(76) Inventor: Hao Min, Nanjing (CN)

( * ) Notice: Subject to any disclaimer, the term of this patent is extended or adjusted under 35 U.S.C. 154(b) by 78 days.

(21) Appl. No.: 13/589,785

(22) Filed: Aug. 20, 2012

(65) Prior Publication Data
US 2012/0314862 A1 Dec. 13, 2012

Related U.S. Application Data

(63) Continuation of application No. PCT/CN2011/076679, filed on Jun. 30, 2011.

(30) Foreign Application Priority Data

Jun. 9, 2011 (CN) .......................... 2011 1 0154574

(51) Int. Cl.
G06F 7/04 (2006.01)
H04L 9/32 (2006.01)
G07F 19/00 (2006.01)
G06Q 20/38 (2012.01)

(52) U.S. Cl.
CPC ............ *H04L 9/3271* (2013.01); *H04L 9/3215* (2013.01); *G07F 19/20* (2013.01); *G06Q 20/385* (2013.01); *H04L 2209/56* (2013.01)
USPC ................. 726/5; 726/3; 726/4; 726/6; 726/7

(58) Field of Classification Search
CPC .................................................... H04L 9/0656
USPC .......................................................... 726/3–7
See application file for complete search history.

(56) References Cited

U.S. PATENT DOCUMENTS

2006/0136739 A1* 6/2006 Brock et al. .................. 713/184
2007/0136573 A1* 6/2007 Steinberg ..................... 713/155
(Continued)

FOREIGN PATENT DOCUMENTS

CN 1707499 A 12/2005
CN 101057051 A 10/2007
CN 101297327 A 10/2008

OTHER PUBLICATIONS

Li et al., "USB Key-based Dual-factor Dynamic Authentication Scheme" Computational Intelligence and Security (CIS), 2010 International Conference, pp. 446-449.*

(Continued)

*Primary Examiner* — Luu Pham
*Assistant Examiner* — Roderick Tolentino
(74) *Attorney, Agent, or Firm* — Tim Tingkang Xia, Esq.; Morris, Manning & Martin, LLP

(57) ABSTRACT

A method for ATM Electronic Lock System comprising the steps: (a) a user using ATM card and entering PIN in an ATM Electronic Lock Subsystem, (b) the ATM Lock System authenticating the user, (c) generating a RND and Local One Time Code (LOTC) with the user's personal ID, Equipment ID, (d) displaying the RND to the user and the user sending the RND to ATM management center via mobile device, (e) the Management Center authenticating the user and generating a Management Center One Time Code (MC-OTC) and sending the MC-OTC to the user's mobile device, (f) the user entering the MC-OTC to the ATM Electronic Lock Subsystem, (g) the ATM Electronic Lock Subsystem comparing the MC-OTC with LOTC, and sending unlock command to unlock the ATM Electronic Lock System to allow user to access the ATM if the MC-OTC matches the LOTC, otherwise, the ATM Electronic Lock System remains locked.

15 Claims, 2 Drawing Sheets

(56) References Cited

U.S. PATENT DOCUMENTS

| | | | |
|---|---|---|---|
| 2007/0203850 A1* | 8/2007 | Singh et al. | 705/67 |
| 2007/0255662 A1* | 11/2007 | Tumminaro | 705/79 |
| 2008/0066168 A1* | 3/2008 | Gregg et al. | 726/7 |
| 2008/0098464 A1* | 4/2008 | Mizrah | 726/5 |
| 2008/0276098 A1* | 11/2008 | Florencio et al. | 713/183 |
| 2011/0078773 A1* | 3/2011 | Bhasin et al. | 726/5 |
| 2011/0289576 A1* | 11/2011 | Cheng | 726/9 |
| 2013/0060892 A1* | 3/2013 | Barthelemy | 709/217 |

OTHER PUBLICATIONS

Al-Assam et al., "On Security of Multi-Factor Biometric Authentication" Internet Technology and Secured Transactions (ICITST), 2010 International Conference, pp. 1-6.*

State Intellectual Property Office of P. R. China (ISR/CN), "International Search Report", for International Application No. PCT/CN2011/076679, issued on Mar. 22, 2012, China.

* cited by examiner

SYSTEM AND METHOD FOR AN ATM ELECTRONIC LOCK SYSTEM

CROSS-REFERENCE TO RELATED APPLICATION

This application is a continuation of International Patent Application No. PCT/CN2011/076679, with an international filing date of Jun. 30, 2011, entitled "A Controlling And Managing System And Method Thereof For An Electronic Lock Based on Identification Technology and Mobile Communication Technology" by Hao Min, designating the United States, now pending. The contents of the specification are incorporated herein by reference.

FIELD OF THE INVENTION

The present invention relates generally to access to an Automated Teller Machine (ATM), and more particularly to a method and a system for an ATM Electronic Lock System.

BACKGROUND OF THE INVENTION

Since ATM was invented in the early 1960s, ATM has become widely used, and ATM transactions have become more and more important part of banking transactions. With the rapid development of information technology and internet technology, transactions based on self-service banking represented by ATM transaction started to replace a large portion of traditional banking transactions. It allows customers to conveniently access to their accounts, withdraw and deposit cash, make payments and inquiries, without standing in a long line in the banking center. The ATM based banking transaction become more and more important tool of customer service for modern commercial banks. It has the advantages of low cost, high efficiency, high manageability, and high profitability.

With over 2 millions ATM deployed world wide, management and safety of these ATMs becomes an important issue, especially for those off-bank ATMs deployed away from banking centers, as well as those deployed in remote areas. Adding an additional electronic lock at an ATM will definitely increase the security of the ATMs and prevent unauthorized access to the ATMs.

Therefore, heretofore unaddressed needs exist in the art to address the aforementioned deficiencies and inadequacies.

SUMMARY OF THE INVENTION

In one aspect, the present invention relates to an ATM Electronic Lock System. In one embodiment, the ATM Electronic Lock System includes: (a) a Mobile Communication Network, (b) a Mobile Communication Terminal used by a user, (c) an ATM Management Center Control and Management Subsystem in communication with the Mobile Communication Terminal through the Public Mobile Communication Network, and (d) an ATM Electronic Lock Subsystem.

In one embodiment, the ATM Electronic Lock Subsystem includes: (a) a Master Control Module for receiving information from ATM Management Center, controlling and managing the ATM Electronic Lock System, (b) an Information Input Module in communication with the Master Control Module for receiving the user's input of a Management Center One Time Code and sending the Management Center One Time Code to the Master Control Module, (c) a Personal ID Authentication Module in communication with the Master Control Module for retrieving user's personal information from the Master Control Module and authenticating the user's personal information by comparing the user's personal information with the user's personal information stored in a database and the authentication is successful if the user's personal information matches the user's personal information stored in the database, (d) a Controller Encryption and Decryption Module in communication with the Master Control Module for encrypting and decrypting user's personal information, authenticating the user's personal information, generating an equipment ID code and an Authenticated Personal ID Code after successful authentication and sending to the Master Control Module, generating a random code RND, and generating a local one time code (LOTC), (e) an Output Display Module in communication with the Master Control Module for displaying random code RND information from the Master Control Module to the user, and (f) a lock actuating mechanism in communication with the Master Control Module for locking and unlocking the ATM according to commands from the Master Control Module.

In one embodiment, the ATM Management Center Control and Management Subsystem includes: (a) a Management Center Control Host for receiving and transmitting a user's personal identification information from and to the Mobile Communication Terminal and performing user authentication, (b) a Management Center Encryption and Decryption Module in communication with the Management Center Control Host for encrypting and decrypting a user's personal identification information and generating Management Center One Time Code based on the random code RND, and (c) a Management Center Mobile Communication Module in communication with the Management Center Control Host for communicating with the ATM Electronic Lock.

Subsystem via the Public Mobile Communication Network and Mobile Communication Terminal.

In one embodiment, the random code RND is used to generate Management Center One Time Code and Local One Time Code according to a predetermined mathematical algorithm to ensure the Management Center One Time Code generated at the Management Center matches with the Local One Time Code generated at local ATM.

In one embodiment, the user's personal information includes: (a) information stored in the ATM card the user is using, and (b) the user's personal Identification Number the user enters to the Information Input Module. The information stored in the ATM the user is using includes: (a) electronic identity recognition chip, (b) electronic finger print recognition information, (c) electronic palm print recognition information, (d) electronic vein recognition information, (e) electronic facial recognition information, and (f) electronic iris recognition information.

In one embodiment, the random code RND further comprises ATM Equipment ID code and the Authenticated Personal ID Code. The RND is transmitted by the user manually through the user's Mobile Communication Terminal via the Public Mobile Communication Network to the Management Center Mobile Communication Module. The Management Center One Time Code is received by the user through the user's Mobile Communication Terminal and manually entered by the user through the keyboard of the Information Input Module on the ATM.

In another aspect, the present invention related to a method for ATM Electronic Lock System. The ATM Electronic Lock System includes a Mobile Communication Network, a Mobile Communication Terminal used by a user, an ATM Management Center Control and Management Subsystem in communication with the Mobile Communication Terminal through the Public Mobile Communication Network, and an ATM Electronic Lock Subsystem.

In one embodiment, the ATM Electronic Lock Subsystem includes: (a) a Master Control Module for receiving information from ATM Management Center, controlling and managing the ATM Electronic Lock System, (b) an Information Input Module in communication with the Master Control Module for receiving the user's input of a Management Center One Time Code and sending the Management Center One Time Code to the Master Control Module, (c) a Personal ID Authentication Module in communication with the Master Control Module for retrieving user's personal information from the Master Control Module and authenticating the user's personal information by comparing the user's personal information with the user's personal information stored in a database and the authentication is successful if the user's personal information matches the user's personal information stored in the database, (d) a Controller Encryption and Decryption Module in communication with the Master Control Module for encrypting and decrypting user's personal information, authenticating the user's personal information, generating an equipment ID code and an Authenticated Personal ID Code after successful authentication and sending to the Master Control Module, generating a random code RND, and generating a local one time code (LOTC), (e) an Output Display Module in communication with the Master Control Module for displaying random code RND information from the Master Control Module, and (f) a lock actuating mechanism in communication with the Master Control Module for locking and unlocking the ATM according to commands from the Master Control Module.

In one embodiment, the ATM Management Center Control and Management Subsystem includes: (a) a Management Center Control Host for receiving and transmitting a user's personal identification information from and to the Mobile Communication Terminal and performing user authentication, (b) a Management Center Encryption and Decryption Module in communication with the Management Center Control Host for encrypting and decrypting a user's personal identification information and generating Management Center One Time Code based on the random code RND, and (c) a Management Center Mobile Communication Module in communication with the Management Center Control Host for communicating with the ATM Electronic Lock Subsystem via the Public Mobile Communication Network and Mobile Communication Terminal.

In one embodiment, the method includes following steps:
(101) entering a user's personal information by swiping an ATM card and entering user's personal identification number at an ATM terminal with an ATM Electronic Lock System;
(102) authenticating the user's personal information by a Personal ID Authenticating Module of the ATM Electronic Lock Subsystem, and transmitting the Authenticated Personal ID Code to a Master Control Module of the ATM Electronic Lock Subsystem when the user is authenticated, otherwise the ATM Electronic Lock System remain locked;
(103) transmitting the Authenticated Personal ID Code, an ATM Equipment ID Code by the Master Control Module to a Controller Encryption-Decryption Module of the ATM Electronic Lock Subsystem, generating a random code RND, and a Local One Time Code by using a predetermined mathematical algorithm by the Controller Encryption-Decryption Module of the ATM Electronic Lock Subsystem, and transmitting the RND to an Output Display Module to display to the user;
(104) transmitting the RND to a Management Center Mobile Communication Module of the ATM Management Center Control and Management Subsystem via a user's Mobile Communication Terminal by using SMS or MMS and then transmitting to a Management Center Control Host;
(105) performing user personal information authentication by decoding the RND to extract user's personal information at the ATM Management Center Control and Management Subsystem;
(106) transmitting the RND to a Management Center Encryption-Decryption Module of the ATM Management Center Control and Management Subsystem if the user's personal information is authenticated;
(107) processing the RND by the Management Center Encryption-Decryption Module and generating a Management Center One Time Code by using the RND and the same predetermined mathematical algorithm for the LOTC, and transmitting the Management Center One Time Code to the Management Center Control Host of the ATM Management Center Control and Management Subsystem;
(108) transmitting the Management Center One Time Code to the user's Mobile Communication Terminal by using SMS or MMS through a Management Center Mobile Communication Module of the ATM Management Center Control and Management Subsystem;
(109) entering the Management Center One Time Code through an Information Input Module to the Master Control Module after the user receives the Management Center One Time Code; and
(110) comparing the Management Center One Time Code with Local One Time Code by the Master Control Module, the Master Control Module sending unlock command to a Lock Actuating Mechanism of the ATM Electronic Lock Subsystem to unlock the ATM Electronic Lock System to allow user to access the ATM if the Management Center One Time Code matches the Local One Time Code, otherwise, the ATM Electronic Lock System remains locked.

In one embodiment, the random code RND is used to generate Management Center One Time Code and Local One Time Code according to a predetermined mathematical algorithm to ensure the Management Center One Time Code generated at the Management Center matches with the Local One Time Code generated at local ATM.

In one embodiment, the user's personal information includes: (a) information stored in the ATM card the user is using, and (b) the user's personal Identification Number the user enters to the Information Input Module. The information stored in the ATM the user is using includes: (a) electronic identity recognition chip, (b) electronic finger print recognition information, (c) electronic palm print recognition information, (d) electronic vein recognition information, (e) electronic facial recognition information, and (f) electronic iris recognition information.

In one embodiment, the random code RND further comprises ATM Equipment ID code and the Authenticated Personal ID Code. The RND is transmitted by the user manually through the user's Mobile Communication Terminal via the Public Mobile Communication Network to the Management Center Mobile Communication Module. The Management Center One Time Code is received by the user through the user's Mobile Communication Terminal and manually entered by the user through the keyboard of the Information Input Module on the ATM.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
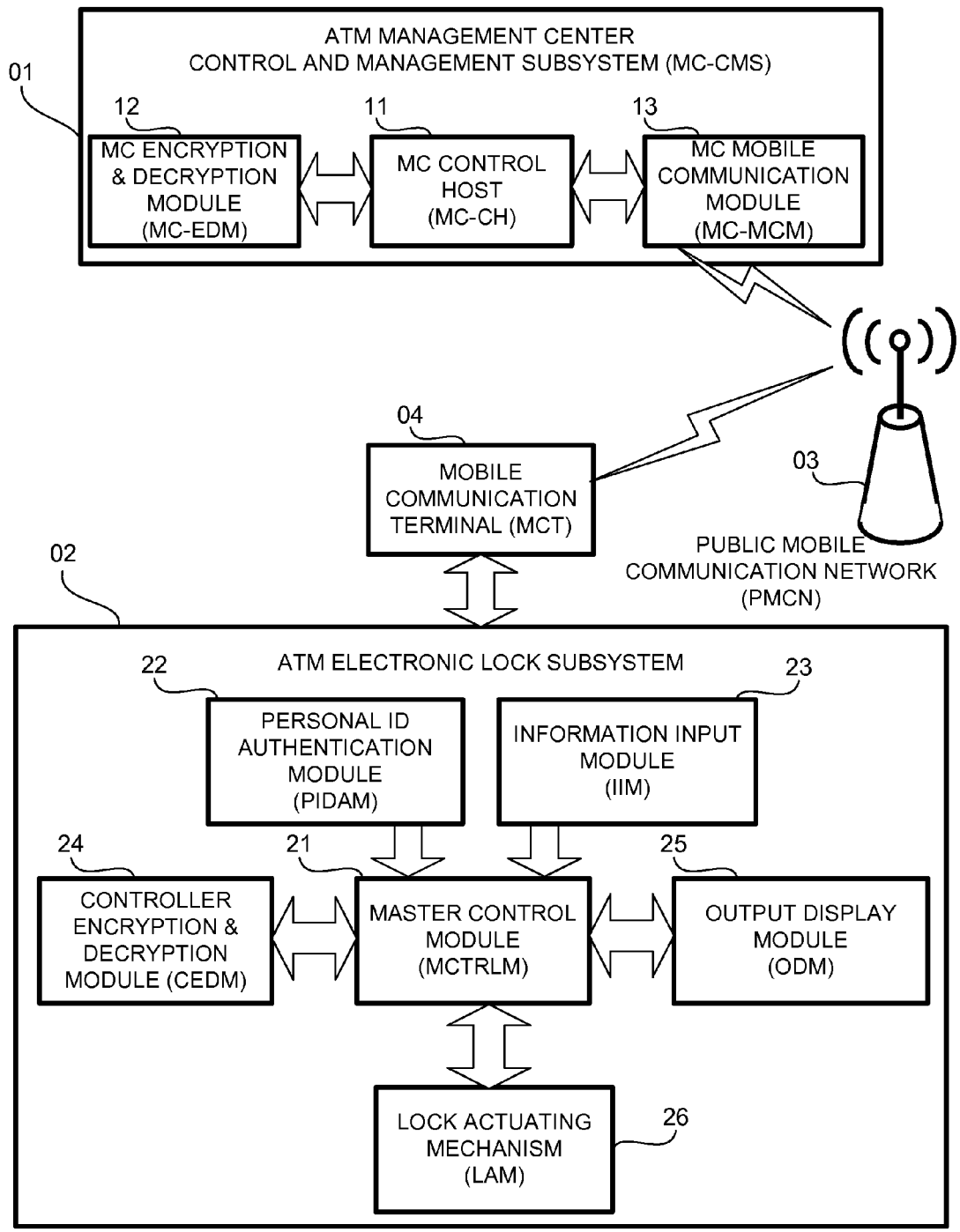
FIG. 1 is a block diagram of an ATM Electronic Lock System according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

Prior to a detailed description of the present invention, the following definitions are provided as an aid to understanding the subject matter and terminology of aspects of the present invention, and not necessarily limiting of the present invention, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

DEFINITIONS/GLOSSARY

APIDC: Authenticated Personal ID Code
ATM: Automated Teller Machine
CEDM: Controller Encryption and Decryption Module
EIDC: Equipment ID Code
IIM: Information Input Module
LAM: Lock Actuating Mechanism
LOTC: Local One Time Code
MC: Management Center
MC-CH: Management Center Control Host
MC-CMS: Management Center Control and Management Subsystem
MC-EDM: Management Center Encryption and Decryption Module
MC-MCM: Management Center Mobile Communication Module
MC-OTC: Management Center One Time Code
MCT: Mobile Communication Terminal
MCTRLM: Master Control Module
MMS: Multimedia Messaging Service
ODM: Output Display Module
PIDAM: Personal ID Authentication Module
PIN: Personal Identification Number
PMCN: Public Mobile Communication Network
RND: Random Code
SMS: Short Messaging Service The description will be made as to the embodiments of the present invention in conjunction with the accompanying drawings in FIGS. 1-2.

In accordance with the purposes of this invention, as embodied and broadly described herein, this invention, in one aspect, relates to an ATM Electronic Lock System as shown in FIG. 1. In one embodiment, the ATM Electronic Lock System includes: (a) a Public Mobile Communication Network (PMCN) 03, (b) a Mobile Communication Terminal (MCT) 04 used by a user, (c) an ATM Management Center Control and Management Subsystem (MC-CMS) 01 in communication with the MCT 04 through the PMCN 03, and (d) an ATM Electronic Lock Subsystem 02.

In one embodiment, the ATM Electronic Lock Subsystem 02 includes:

(a) a Master Control Module (MCTRLM) 21 for receiving information from ATM Management Center Control and Management Subsystem (MC-CMS) 01, controlling and managing the ATM Electronic Lock System;

(b) an Information Input Module (IIM) 23 in communication with the MCTRLM 21 for receiving the user's input of a Management Center One Time Code (MC-OTC) and sending the MC-OTC to the MCTRLM 21;

(c) a Personal ID Authentication Module (PIDAM) 22 in communication with the MCTRLM 21 for retrieving user's personal information from the MCTRLM 21 and authenticating the user's personal information by comparing the user's personal information with the user's personal information stored in a database and the authentication is successful if the user's personal information matches the user's personal information stored in the database;

(d) a Controller Encryption and Decryption Module (CEDM) 24 in communication with the MCTRLM 21 for encrypting and decrypting user's personal information, authenticating the user's personal information, generating an Equipment ID Code (EIDC) and an Authenticated Personal ID Code (APIDC) after successful authentication and sending to the MCTRLM 21, generating a random code RND, and generating a Local One Time Code (LOTC);

(e) an Output Display Module (ODM) 25 in communication with the MCTRLM 21 for displaying random code RND from the MCTRLM 21 to the user, and (f) a Lock Actuating Mechanism (LAM) 26 in communication with the MCTRLM 21 for locking and unlocking the ATM according to commands from the MCTRLM 21.

In one embodiment, the ATM MC-CMS 01 includes:

(a) a Management Center Control Host (MC-CH) 11 for receiving and transmitting a user's personal identification information from and to the MCT 04 and performing user authentication;

(b) a Management Center Encryption and Decryption Module (MC-EDM) 12 in communication with the Management Center Control Host for encrypting and decrypting a user's personal identification information and generating Management Center One Time Code based on the random code RND; and (c) a Management Center Mobile Communication Module (MC-MCM) 13 in communication with the MC-CH 11 for communicating with the ATM Electronic Lock Subsystem via the PMCN 03 and MCT 04.

In one embodiment, the random code RND is used to generate MC-OTC and LOTC according to a predetermined mathematical algorithm to ensure the MC-OTC generated at the Management Center matches with the LOTC generated at local ATM.

In one embodiment, the user's personal information includes but not limited to:

(a) information stored in the ATM card the user is using; and (b) the user's personal Identification Number the user enters to the IIM 23.

The information stored in the ATM the user is using includes but not limited to:

(a) electronic identity recognition chip;
(b) electronic finger print recognition information;
(c) electronic palm print recognition information;
(d) electronic vein recognition information;
(e) electronic facial recognition information; and
(f) electronic iris recognition information.

In one embodiment, the random code RND further comprises ATM EIDC and the APIDC. The RND is transmitted by the user manually through the user's MCT 04 via the PMCN 04 to the MC-MCM 13. The MC-OTC is received by the user through the user's MCT 04 and manually entered by the user through the keyboard of the IIM 23 on the ATM.

Figure 2:
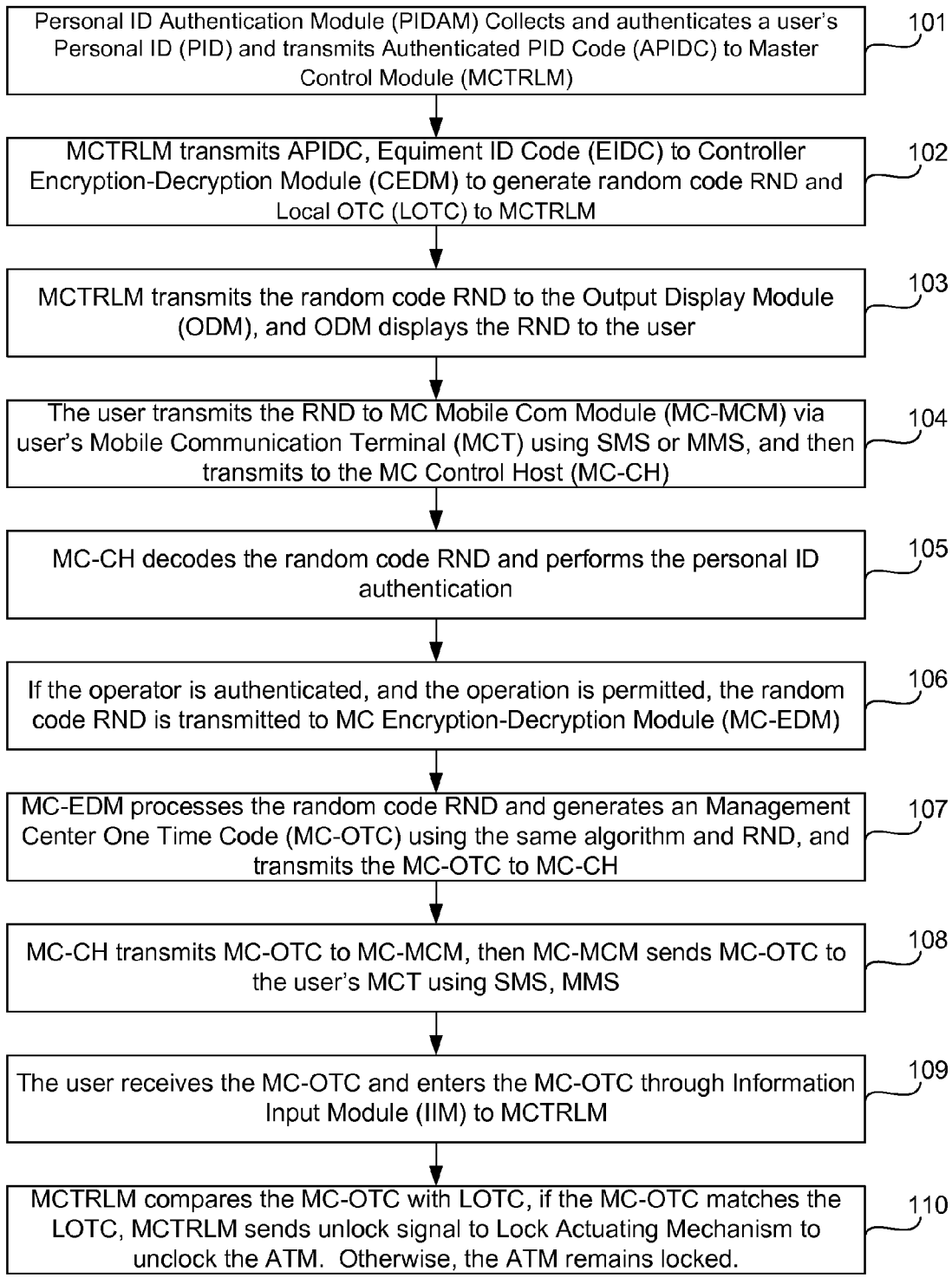
FIG. 2 is a flow chart of a method of an ATM Electronic Lock System according to one embodiment of the present invention.

In another aspect, the present invention related to a method for ATM Electronic Lock System. Referring now to FIGS. 1 and 2, in one embodiment, the ATM Electronic Lock System includes a Public Mobile Communication Network (PMCN) 03, a Mobile Communication Terminal (MCT) 04 used by a user, an ATM Management Center Control and Management Subsystem (MC-CMS) 01 in communication with the MCT 04 through the PMCN 03, and an ATM Electronic Lock Subsystem 02.

In one embodiment, the ATM Electronic Lock Subsystem 02 includes:

(a) a Master Control Module (MCTRLM) 21 for receiving information from ATM Management Center Control and Management Subsystem (MC-CMS) 01, controlling and managing the ATM Electronic Lock System;

(b) an Information Input Module (IIM) 23 in communication with the MCTRLM 21 for receiving the user's input of a Management Center One Time Code (MC-OTC) and sending the MC-OTC to the MCTRLM 21;

(c) a Personal ID Authentication Module (PIDAM) 22 in communication with the MCTRLM 21 for retrieving user's personal information from the MCTRLM 21 and authenticating the user's personal information by comparing the user's personal information with the user's personal information stored in a database and the authentication is successful if the user's personal information matches the user's personal information stored in the database;

(d) a Controller Encryption and Decryption Module (CEDM) 24 in communication with the MCTRLM 21 for encrypting and decrypting user's personal information, authenticating the user's personal information, generating an Equipment ID Code (EIDC) and an Authenticated Personal ID Code (APIDC) after successful authentication and sending to the MCTRLM 21, generating a random code RND, and generating a Local One Time Code (LOTC);

(e) an Output Display Module (ODM) 25 in communication with the MCTRLM 21 for displaying random code RND from the MCTRLM 21, and (f) a Lock Actuating Mechanism (LAM) 26 in communication with the MCTRLM 21 for locking and unlocking the ATM according to commands from the MCTRLM 21.

In one embodiment, the ATM MC-CMS 01 includes:

(a) a Management Center Control Host (MC-CH) 11 for receiving and transmitting a user's personal identification information from and to the MCT 04 and performing user authentication;

(b) a Management Center Encryption and Decryption Module (MC-EDM) 12 in communication with the Management Center Control Host for encrypting and decrypting a user's personal identification information and generating Management Center One Time Code based on the random code RND; and (c) a Management Center Mobile Communication Module (MC-MCM) 13 in communication with the MC-CH 11 for communicating with the ATM Electronic Lock Subsystem via the PMCN 03 and MCT 04.

In one embodiment, the method includes following steps:

(101) entering a user's personal information by swiping an ATM card and entering user's Personal Identification Number (PIN) at an ATM terminal with an ATM Electronic Lock System;

(102) authenticating the user's personal information by the PIDAM 22 of the ATM Electronic Lock Subsystem, and transmitting the Authenticated Personal ID Code (APIDC) to the MCTRLM 21 of the ATM Electronic Lock Subsystem 02 when the user is authenticated, otherwise the ATM Electronic Lock System remain locked;

(103) transmitting the APIDC, an ATM Equipment ID Code (EIDC) by the MCTRLM 21 to the CEDM 24 of the ATM Electronic Lock Subsystem, generating a random code RND, and a Local One Time Code (LOTC) by using a predetermined mathematical algorithm by the CEDM 24 of the ATM Electronic Lock Subsystem, and transmitting the RND to the ODM 25 to display to the user;

(104) transmitting the RND to a MC-MCM 13 of the ATM MC-CMS 01 via a user's MCT 04 by using SMS or MMS and then transmitting to the MC-CH 11;

(105) performing user personal information authentication by decoding the RND to extract user's personal information at the ATM MC-CMS 01;

(106) transmitting the RND to the MC-EDM 12 of the ATM MC-CMS 01 if the user's personal information is authenticated;

(107) processing the RND by the MC-EDM 12 and generating a Management Center One Time Code (MC-OTC) by using the RND and the same predetermined mathematical algorithm for the LOTC, and transmitting the MC-OTC to the MC-CH 11 of the ATM MC-CMS 01;

(108) transmitting the MC-OTC to the user's MCT 04 by using SMS or MMS through the MC-MCM 13 of the ATM MC-CMS 01;

(109) entering the MC-OTC through an IIM 23 to the MCTRLM 21 after the user receives the MC-OTC; and (110) comparing the MC-OTC with LOTC by the MCTRLM 21, the MCTRLM 21 sending unlock command to the LAM 26 of the ATM Electronic Lock Subsystem to unlock the ATM Electronic Lock System to allow user to access the ATM if the MC-OTC matches the LOTC. Otherwise, the ATM Electronic Lock System remains locked.

In one embodiment, the random code RND is used to generate MC-OTC and LOTC according to a predetermined mathematical algorithm to ensure the MC-OTC generated at the Management Center matches with the LOTC generated at local ATM.

In one embodiment, the user's personal information includes but not limited to:

(a) information stored in the ATM card the user is using; and (b) the user's personal Identification Number the user enters to the IIM 23.

The information stored in the ATM the user is using includes but not limited to:

(a) electronic identity recognition chip;

(b) electronic finger print recognition information;

(c) electronic palm print recognition information;

(d) electronic vein recognition information;

(e) electronic facial recognition information; and (f) electronic iris recognition information.

In one embodiment, the random code RND further comprises ATM EIDC and the APIDC. The RND is transmitted by the user manually through the user's MCT 04 via the PMCN 04 to the MC-MCM 13. The MC-OTC is received by the user through the user's MCT 04 and manually entered by the user through the keyboard of the IIM 23 on the ATM.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An Automated Teller Machine (ATM) Electronic Lock System, comprising:
   (a) a Public Mobile Communication Network;
   (b) a Mobile Communication Terminal used by a user;
   (c) an ATM Management Center Control and Management Subsystem of an ATM Management Center in communication with the Mobile Communication Terminal through the Public Mobile Communication Network; and
   (d) an ATM Electronic Lock Subsystem, comprising:
      a Master Control Module for receiving information from the ATM Management Center, and controlling and managing the ATM Electronic Lock System;
      an Information Input Module in communication with the Master Control Module for receiving the user's input of a Management Center One Time Code and sending the Management Center One Time Code to the Master Control Module;
      a Personal Identity (ID) Authentication Module in communication with the Master Control Module for retrieving user's personal information from the Master Control Module and authenticating the user's personal information by comparing the user's personal information with the user's personal information stored in a database, wherein the authentication is successful if the user's personal information matches the user's personal information stored in the database;
      a Controller Encryption and Decryption Module in communication with the Master Control Module for encrypting and decrypting user's personal information, authenticating the user's personal information, generating an Equipment ID Code and an Authenticated Personal ID Code after successful authentication and sending to the Master Control Module, generating a random code, RND, and generating a Local One Time Code;
      an Output Display Module in communication with the Master Control Module for displaying the random code RND from the Master Control Module to the user; and
      a Lock Actuating Mechanism in communication with the Master Control Module for locking and unlocking the ATM according to commands from the Master Control Module,
   wherein the ATM Management Center Control and Management Subsystem comprises:
      a Management Center Control Host for receiving and transmitting a user's personal identification information from and to the Mobile Communication Terminal, and performing user authentication;
      a Management Center Encryption and Decryption Module in communication with the Management Center Control Host for encrypting and decrypting a user's personal identification information and generating the Management Center One Time Code based on the random code RND; and
      a Management Center Mobile Communication Module in communication with the Management Center Control Host for communicating with the ATM Electronic Lock Subsystem via the Public Mobile Communication Network and the Mobile Communication Terminal; and
   wherein the random code RND is used to generate Management Center One Time Code and Local One Time Code according to a predetermined mathematical algorithm to ensure the Management Center One Time Code generated at the ATM Management Center matches with the Local One Time Code generated at the local ATM.

2. The system according to claim 1, wherein the user's personal information comprises:
   (a) information stored in the ATM card the user is using; and
   (b) the user's Personal Identification Number the user enters to the Information Input Module.

3. The system according to claim 2, wherein the information stored in the ATM the user is using comprises:
   (a) electronic identity recognition chip;
   (b) electronic finger print recognition information;
   (c) electronic palm print recognition information;
   (d) electronic vein recognition information;
   (e) electronic facial recognition information; and
   (f) electronic iris recognition information.

4. The system according to claim 3, wherein the random code RND further comprises ATM Equipment ID code and the Authenticated Personal ID Code.

5. The system according to claim 4, wherein the random code RND is transmitted by the user manually through the user's Mobile Communication Terminal via the Public Mobile Communication Network to the Management Center Mobile Communication Module.

6. The system according to claim 5, wherein the Management Center One Time Code is received by the user through the user's Mobile Communication Terminal and manually entered by the user through the keyboard of the Information Input Module on the ATM.

7. A method for an Automated Teller Machine (ATM) Electronic Lock System having a Public Mobile Communication Network, a Mobile Communication Terminal used by a user, an ATM Management Center Control and Management Subsystem of an ATM Management Center in communication with the Mobile Communication Terminal through the Public Mobile Communication Network, and an ATM Electronic Lock Subsystem, the method comprising the steps of:
   (101) entering a user's personal information by swiping an ATM card and entering user's personal identification number at an ATM terminal with an ATM Electronic Lock System;
   (102) authenticating the user's personal information by a Personal Identity (ID) Authenticating Module of the ATM Electronic Lock Subsystem, and transmitting the Authenticated Personal ID Code to a Master Control Module of the ATM Electronic Lock Subsystem when the user is authenticated, otherwise the ATM Electronic Lock System remain locked;
   (103) transmitting the Authenticated Personal ID Code, an Equipment ID code by the Master Control Module to a Controller Encryption-Decryption Module of the ATM Electronic Lock Subsystem, generating a random code, RND, and a Local One Time Code by using a predetermined mathematical algorithm by the Controller Encryption-Decryption Module of the ATM Electronic Lock Subsystem, and transmitting the random code RND to an Output Display Module of the ATM Electronic Lock Subsystem to display to the user;
   (104) transmitting the random code RND to a Management Center Mobile Communication Module of the Management Center Control and Management Subsystem via a user's Mobile Communication Terminal by using Short Messaging Service (SMS) or Multimedia Messaging Service MMS) and then transmitting to a Management Center Control Host of the ATM Management Center Control and Management Subsystem;
   (105) performing user personal information authentication by decoding the random code RND to extract user's personal information at the ATM Management Center Control and Management Subsystem;
   (106) transmitting the random code RND to a Management Center Encryption-Decryption Module of the ATM Management Center Control and Management Subsystem if the user's personal information is authenticated;
   (107) processing the random code RND by a Management Center Encryption and Decryption Module of the ATM Management Center Control and Management Subsystem and generating a Management Center One Time Code by using the random code RND and the same predetermined mathematical algorithm for the Local One Time Code, and transmitting the Management Center One Time Code to the Management Center Control Host of the ATM Management Center Control and Management Subsystem;
   (108) transmitting the Management Center One Time Code to the user's Mobile Communication Terminal by using the SMS or MMS through a Management Center Mobile Communication Module of the ATM Management Center Control and Management Subsystem;
   (109) entering the Management Center One Time Code through an Information Input Module of the ATM Electronic Lock Subsystem to the Master Control Module after the user receives the Management Center One Time Code; and
   (110) comparing the Management Center One Time Code with Local One Time Code by the Master Control Module, the Master Control Module sending unlock command to a Lock Actuating Mechanism of the ATM Electronic Lock Subsystem to unlock the ATM Electronic Lock System to allow user to access the ATM if the Management Center One Time Code matches the Local One Time Code, otherwise, the ATM Electronic Lock System remains locked.

8. The method according to claim 7, wherein the ATM Electronic Lock Subsystem is further used for:
   (a) by the Master Control Module, receiving information from the ATM Management Center, and controlling and managing the ATM Electronic Lock System;
   (b) by the Information Input Module in communication with the Master Control Module receiving the user's input of a Management Center One Time Code and sending the Management Center One Time Code to the Master Control Module;
   (c) by the Personal ID Authentication Module in communication with the Master Control Module, retrieving user's personal information from the Master Control Module and authenticating the user's personal information by comparing the user's personal information with the user's personal information stored in a database, wherein the authentication is successful if the user's personal information matches the user's personal information stored in the database;
   (d) by the Controller Encryption and Decryption Module in communication with the Master Control Module, encrypting and decrypting user's personal information, authenticating the user's personal information, generating an Equipment ID Code and an Authenticated Personal ID Code after successful authentication and sending to the Master Control Module, generating a random code RND, and generating a local one time code;

(e) by the Output Display Module in communication with the Master Control Module, displaying the random code RND from the Master Control Module; and (f) by the Lock Actuating Mechanism in communication with the Master Control Module, for locking and unlocking the ATM according to commands from the Master Control Module.

9. The method according to claim 8, wherein the ATM Management Center Control and Management Subsystem is further used for:

(a) by the Management Center Control Host receiving and transmitting a user's personal identification information from and to the Mobile Communication Terminal, and performing user authentication;

(b) by the Management Center Encryption and Decryption Module in communication with the Management Center Control Host, encrypting and decrypting a user's personal identification information and generating Management Center One Time Code based on the random code RND; and (c) by the Management Center Mobile Communication Module in communication with the Management Center Control Host, communicating with the ATM Electronic Lock Subsystem via the Public Mobile Communication Network and Mobile Communication Terminal.

10. The method according to claim 9, wherein the random code RND is used to generate Management Center One Time Code and Local One Time Code according to the predetermined mathematical algorithm to ensure the Management Center One Time Code generated at the Management Center matches with the Local One Time Code generated at local ATM.

11. The method according to claim 10, wherein the user's personal information comprises:

(a) information stored in the ATM card the user is using; and (b) the user's personal Identification Number the user enters to the Information Input Module.

12. The method according to claim 11, wherein the information stored in the ATM the user is using comprises:

(a) electronic identity recognition chip;

(b) electronic finger print recognition information;

(c) electronic palm print recognition information;

(d) electronic vein recognition information;

(e) electronic facial recognition information; and (f) electronic iris recognition information.

13. The method according to claim 12, wherein the random code RND further comprises ATM Equipment ID Code and the Authenticated Personal ID Code.

14. The method according to claim 13, wherein the random code RND is manually transmitted by the user through the user's Mobile Communication Terminal via the Public Mobile Communication Network to the Management Center Mobile Communication Module using SMS or MMS.

15. The method according to claim 14, wherein the Management Center One Time Code is received by the user through the user's Mobile Communication Terminal and manually entered by the user through the keyboard of the Information Input Module of the ATM Electronic Lock Subsystem on the ATM.

* * * * *